United States Patent
Craig et al.

(10) Patent No.: US 11,858,231 B2
(45) Date of Patent: Jan. 2, 2024

(54) CARTON LIDDING AND STACKING APPARATUS AND PROCESS

(71) Applicant: PUNCHBOWL PACKAGING LIMITED, Pukekohe (NZ)

(72) Inventors: Robert Lindsay Craig, Pukekohe (NZ); Simon John Craig, Pukekohe (NZ); Mark Francis Roche, Pukekohe (NZ)

(73) Assignee: PUNCHBOWL AUTOMATION IP LIMITED, Pukekohe (NZ)

( * ) Notice: Subject to any disclaimer, the term of this patent is extended or adjusted under 35 U.S.C. 154(b) by 0 days.

(21) Appl. No.: 17/780,309

(22) PCT Filed: Nov. 27, 2020

(86) PCT No.: PCT/NZ2020/050157
§ 371 (c)(1),
(2) Date: May 26, 2022

(87) PCT Pub. No.: WO2021/107788
PCT Pub. Date: Jun. 3, 2021

(65) Prior Publication Data
US 2022/0410520 A1 Dec. 29, 2022

(30) Foreign Application Priority Data
Nov. 27, 2019 (AU) ................................ 2019904483

(51) Int. Cl.
*B31B 50/00* (2017.01)
*B65G 57/30* (2006.01)

(52) U.S. Cl.
CPC ........ *B31B 50/0044* (2017.08); *B65G 57/302* (2013.01); *B65G 2201/025* (2013.01)

(58) Field of Classification Search
CPC . B31B 50/0044; B31B 50/814; B65G 57/302; B65G 2201/025; B65D 5/6644; B31F 2201/0715
See application file for complete search history.

(56) References Cited

U.S. PATENT DOCUMENTS 2,736,487 A * 2/1956 George ................ B65D 5/6644
229/126
3,866,763 A * 2/1975 Alduk .................. B65G 57/302
414/790.1

(Continued)

FOREIGN PATENT DOCUMENTS

| EP | 3321197 A1 | 5/2018 | |
| JP | 105162705 A | 6/1993 | |
| NZ | 244433 A * | 4/1996 | ............. B65B 35/50 |

OTHER PUBLICATIONS

McFarland, Ethan (Authorised Officer), International Search Report and Written Opinion dated Mar. 1, 2021, International Application No. PCT/NZ2020/050157, 18 pages.

*Primary Examiner* — Andrew M Tecco
*Assistant Examiner* — Nicholas E Igbokwe
(74) *Attorney, Agent, or Firm* — MH2 TECHNOLOGY LAW GROUP, LLP (57) ABSTRACT

A process of manipulating a closable carton with lid panels extending from walls of the carton and tabs received in slots formed in the lid panels to secure the lid panels to close the carton. The process has a step of moving a folding element transverse to each wall from which a lid extends to move the one or more lids into a position which closes the carton. The process has a step of lifting the closed carton past a non-return support and into engagement with another carton to provide a stack of closed cartons supported by the non-return support. The process has a step of the support then releasing a stack of closed cartons to a conveyor.

19 Claims, 4 Drawing Sheets

(56) References Cited

U.S. PATENT DOCUMENTS

| | | | |
|---|---|---|---|
| 3,895,477 A | | 7/1975 | Yamashita |
| 4,006,575 A | | 2/1977 | Lee |
| 4,656,810 A | * | 4/1987 | Plaskett .................... B65B 7/24 493/453 |
| 4,674,261 A | * | 6/1987 | Sabel ...................... B65B 5/028 53/242 |
| 5,066,269 A | * | 11/1991 | Center .................... B31B 50/00 493/453 |
| 5,102,382 A | * | 4/1992 | Center .................. B31B 50/006 493/137 |
| 2011/0281705 A1 | | 11/2011 | Aganovic et al. |
| 2012/0317932 A1 | * | 12/2012 | Dunivan ................. B65B 51/00 53/491 |
| 2021/0101354 A1 | * | 4/2021 | Iwasa ..................... B31B 50/16 |

\* cited by examiner

CARTON LIDDING AND STACKING APPARATUS AND PROCESS

CROSS-REFERENCE TO RELATED APPLICATIONS

The present application claims the benefit of priority of International Patent Application No. PCT/NZ2020/050157, filed on Nov. 27, 2020, the disclosure of which is incorporated by reference herein in its entirety.

FIELD OF THE INVENTION

This invention relates to improvements in respect of apparatus and process for lidding and stacking cartons such as for preparing stacks of packed cartons of items for palletization.

BACKGROUND OF THE INVENTION

Items such as fruit are often packaged for transport and distribution. A common package is a carton which can receive items and can be stacked.

Conventionally, cartons are prepared by an operator closing the lid flaps on a carton top and stacking the now closed carton onto other cartons before moving the stacked cartons to a pallet.

It would be of advantage to have an apparatus able to prepare stacks of closed cartons which could at least provide the public with an alternative choice.

It would be of advantage to have a process for preparing stacks of closed cartons which could at least provide the public with an alternative choice.

DISCLOSURE OF THE INVENTION

Aspects of the invention provide a process of manipulating a closable carton having one or more lid panels extending from respective one or more walls of the carton and having one or more tabs and having respective one or more slots adapted to receive the tabs to secure the lid panels in a closed configuration in which the one or more lid panels provides a closure for the carton, the process comprising the step of:

moving a folding element transversely to each wall from which a lid extends to move the one or more lids into the closed configuration to close the carton.

The step of moving a folding element may comprise moving a folding element over the carton, the rolling element comprising a roller with a slot formed in a position which is aligned with a tab. This may allow the folding element to fold the lid to a level which is below an extremity of the respective tab to force the slot of a lid over a tab such that the tab is received in the slot of a respective lid.

The step of moving a folding element may comprise moving the folding element over the carton but between the tabs. This may allow the folding element to fold the lid to a level which is below an extremity of the respective tab to force the slot of a lid over a tab such that the tab is received in the slot of a respective lid. A folding element may comprise a rod. A rod may be adapted to slide over the lid.

The process may comprise securing the carton with one or more fixtures.

The one or more fixtures may engage edges of the carton.

The edge engaged by the one or more fixtures may be located on an end of a wall of the carton and located distal from an edge of the wall from which the lid extends.

The one or more fixtures may engage corners of the carton.

The carton tabs may be arranged to extend through the slots in the lid to extend beyond the lid.

The carton may comprise one or more slots formed in an underside of the carton to allow an upper carton to receive respective one or more tabs from a carton below to secure the upper carton and the carton below in a stack.

The carton may comprise one or more slots formed in an underside of the carton to allow an upper carton to receive respective one or more tabs from a carton below to secure the upper carton and the carton below in alignment in a stack.

The fixture may define one or more apertures through which pushing elements may extend to push a carton upwards to lift the carton.

The process may comprise a step of pushing the carton upwards past one or more locking levers which hold the carton against returning downwards if the one or more pushing element returns downwards.

The process may comprise returning the pushing element downwards to a position under the one or more fixtures.

The step of pushing the carton upwards may comprise pushing the carton up under and into contact with a carton which is supported by one or more locking levers. This may form a stack of the carton supported by the one or more locking levers and the carton which is pushed up past the locking levers.

The step of pushing the carton upwards may be subsequent to the step of folding the lid to form a stack of closed cartons above a position where the carton is secured by the one or more fixtures. This may allow steps of folding of lids to close cartons and stacking of closed cartons in the same position in a packhouse apparatus as seen in a layout of the packhouse apparatus. This may allow a lid-closing and carton stacking station in a single packhouse station.

The process may manipulate a carton which has one or more lids each connected by a foldable join to a wall of the carton.

Aspects of the invention provide a packhouse apparatus comprising:

a fixture which is operable to secure a first carton;

one or more lid-closing elements operable to move over a secured first carton to fold one or more lid panels of the first carton which extend from respective one or more walls of a first carton to close the first carton.

A lid-closing element may be arranged to fold a respective one or more lid panels at a foldable join.

The apparatus may comprise a pushing element operable to push the first carton upwards from the one or more fixtures.

The apparatus may have one or more supports located above the fixtures to support a second carton above the first carton. The support may be arranged to be configurable into a non-return configuration to prevent a carton returning downward. The support may be arranged to be configurable into a release configuration to release a carton to return downward.

The one or more supports may be movable so as to allow the first carton to move past the support to form a stack of the first carton and the second carton.

A support may comprise a lever which is able to pivot to allow a carton to pass when pushed past the lever and pivot downwards to support the carton as it returns from a position past the lever.

The movable support may allow the first carton to be added to a stack of cartons comprising the second carton by the first carton being pushed up under the second carton and then supported by the movable support.

The apparatus may comprise a conveyor to convey a released carton or stack of cartons.

A movable support may comprise a lever attached to a chassis or wall of the apparatus at a pivot which allows the lever to move upwards to allow the first carton to move past the lever and to allow the lever to support the first carton once it has moved past the lever.

A lid-closing element may be operable to move over an open area of the first carton to fold a lid panel over an aperture of the carton to close at least a part of the open area of the first carton.

The lid panel may comprise a closure slot operable to receive a closure tab of the carton to secure the lid panel over the carton aperture.

The one or more lid-closing elements may be operable to move over an open area of the first carton so as to cause a closure slot formed in a lid panel to receive a closure tab of the carton to secure the lid panel over the open area of the carton.

The lid-closing element may be operable to move transversely to a wall of the carton.

The lid-closing element may be operable to move over and above a wall of the first carton within a clearance that is below an upper edge of the closure tab.

The lid closing element may comprise a roller.

The roller may have one or more slots formed therein to admit the closure tab while the roller moves over the first carton. This may allow the roller to move over the carton within a tolerance that is less that the height of the closure tab from the wall to force the closure slot formed in the lid panel into engagement with the closure tab to secure the lid over the carton opening. The roller may have two or more slots formed therein.

The closure element may comprise a closure arm operable to slide over the lid panel.

The closable carton may be a cardboard carton.

The closable carton may be formed of a blank which has been folded to form a carton.

The lid may be provided by a flap of a carton blank wherein the flap is connected to a wall by a foldable join.

A lid may have a folded configuration in which it is closed over the carton and an unfolded configuration in which it leaves the carton open.

A carton may be closed by folding the join of one or more lids to put the one or more lids in a folded configuration.

The one or more lids may have one or more slots formed therein, a slot adapted to receive a tab which extends from a wall of a carton to secure the lid in a folded configuration. This may secure the one or more lids in a position in which the carton is closed.

Aspects of the present invention provide an apparatus for carrying out the steps of closing the lid on a carton and stacking several cartons.

Closing the lid on the carton may comprise locating the carton so as to allow rollers or rods to push the lid panels down such that slots in each panel engage with tabs on the carton thereby retaining the panels in the closed position.

Stacking the cartons may comprise lifting the carton above the lid closing station and holding it in position such that it interlocks with a carton above it and is ready to interlock with a subsequent carton coming from below.

Stacking the cartons may comprise conveying a number of stacked cartons from a stacking station of the apparatus to a palletization station whereby the stacked cartons can be moved onto a pallet.

The apparatus may contain a printer to print the cartons or print labels and affix these to the cartons.

Aspects of the present invention provide a process of providing a stack of closed cartons containing items that have been packed, the process comprising;

closing the lid on a carton;

mating tabs and slots on a carton with respective slots and tabs of other cartons; and applying a printed label to a carton.

BRIEF DESCRIPTION OF THE DRAWINGS

Additional and further aspects of the present invention will be apparent to the reader from the following description of embodiments, given in by way of example only, with reference to the accompanying drawings in which.

Further aspects of the invention will become apparent from the following description of the invention which is given by way of example only of particular embodiments.

BEST MODES FOR CARRYING OUT THE INVENTION

Figure 1:
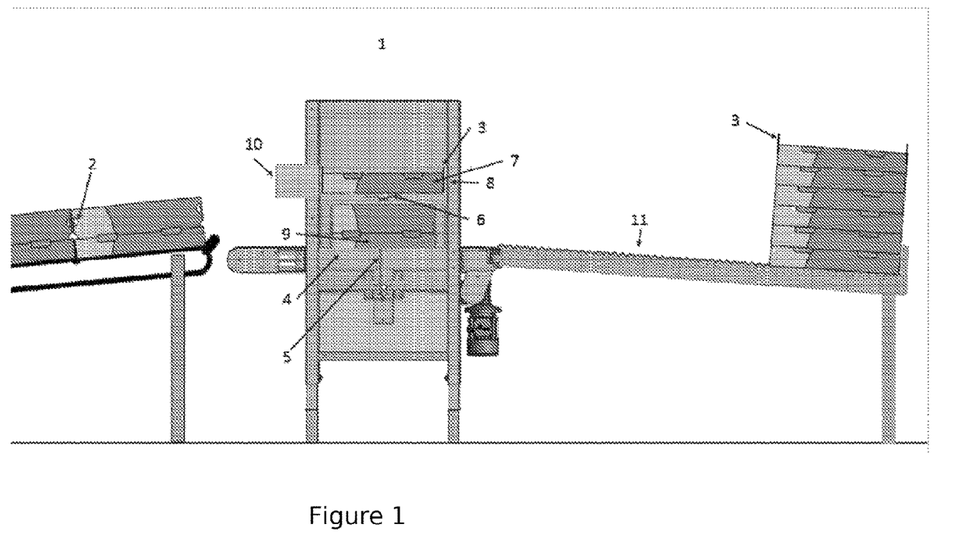
FIG. 1 shows a stacking apparatus according to an embodiment of the present invention, with a carton held upwards by supports and forming part of a stack of cartons.

FIG. 1 shows a carton lidding and stacking apparatus 1 according to an embodiment of the present invention. The apparatus prepares stacks of cartons, or boxes, with are lidded ready for palletisation. The apparatus 1 provides a carton lidding and stacking station in a packhouse apparatus.

In this embodiment the cartons have lid panels 2 that are configurable in an open configuration with lid panels extending from respective walls and a closed configuration in which the lids are held in a position covering an opening in the cartons. The lid panels are secured in the closed configuration by tabs 3 formed on the on top edge of a side wall of the carton. When the lid panels are in the closed configuration the tabs are received in slots formed in the lid panels. By this action the lid panels engage the tabs to secure the lid panels in the closed configuration. In this embodiment the tabs extend through and beyond the lid panels.

In this embodiment the carton has slots in its base that interlock with tabs on another carton when the cartons are stacked vertically to secure the cartons in alignment. In this embodiment the slots are defined in the base of side walls of the carton.

The apparatus is able to receive cartons singularly into the lidding station 4. The lidding device is able to hold the carton so that the slots on the lid flaps align with the tabs on the carton top edge.

In this embodiment the lidding device has slotted rollers able to roll across the lid flaps to press the slots formed in the lid flap onto the tabs on the carton top edge to engage the tabs.

The lidding and stacking station in FIG. 1 has a carton lifter, or pusher, 5 which is able to lift the lidded carton 7 vertically above the lidding station past carton holding ledges 6 mounted on a chassis of the stacking device. In this embodiment the carton holding ledges 6 move out of the way as the carton moves upwards allowing the carton to pass by. The ledges then move back into the holding position so that the carton 7 is supported in a position 8 above the lidding station as the carton lifter 5 moves downwards.

In this embodiment a subsequent carton 9 is lidded in the lidding station 4 and then moved vertically by the carton lifter 5. As the subsequent carton 9 is lifted, the tabs on the top of the carton align with slots in the base of the waiting carton 7. The cartons are locked together and as carton 9 is lifted and pushes on the underside of carton 7 moving both cartons upwards until the base of carton 9 is past the carton holding ledges 6. At the end of this step there are two cartons stacked together in the stacking apparatus with carton 9 now being in position 8 above the lidding station.

In this embodiment a printer 10 is mounted on the end of the apparatus. The printer is able to print and apply a printed label to an end of each carton as the carton is moved into position 8. This label may be in the form of a barcode and may have unique information used in the subsequent supply chain of the packaged carton.

A conveyor 11 is shown in FIG. 1. The conveyor 11 is able to receive stacks of cartons from the lidding and stacking apparatus. The stacking apparatus is able to release stacks of cartons to the conveyor. In this embodiment the number of cartons in each stack is determined by stored data or determined by control operations of a machine operator. When the appropriate number of cartons have been stacked and have had the printed label applied the carton lifter 5 is able to hold the stack of cartons while the carton holding ledges 6 are moved out of the way. The carton lifter is then able to move downwards with the carton stack depositing the stack onto the conveyor 11. The stack of cartons can then be moved out of the apparatus and onto the conveyor 11.

Figure 2:
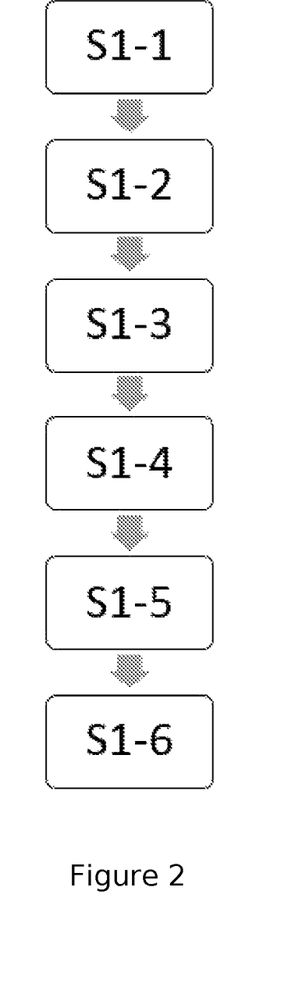
FIG. 2 shows a process diagram of a process according to the embodiment of the present invention of FIGS. 1 and 2.

FIG. 2 shows a process according to another, preferred embodiment of the present invention for providing a stack of closed cartons.

At step S1-1 an open carton which contains items which have been packed is supplied to a lidding device.

At step S1-2 the carton is held firmly by fixtures of the lidding device while the lid panels are closed. The lid panels are closed by being folded inwards and pressed down until slots defined in the lid panels receive and engage with tabs defined on the top of walls of the carton.

At step S1-3 the carton is lifted into a holding position above the lidding station. Movable ledges are translated inwards to hold the carton above the lidding station.

At step S1-4 a printer prints and applies a label to the carton. Step S1-4 may be omitted in some embodiments.

The steps S1-1 to 1-4 are repeated for subsequent cartons. As each carton is lifted into the holding position, tabs on the top of the carton are pushed into slots in the base of the carton above. Each carton pushes on the base of the carton above so that all cartons in the stack are pushed upwards with the bottom carton coming to rest in the holding position provided by holding ledges.

At step S1-5 the last carton in the stack completes steps S1-1 to S1-4. When step S1-4 is complete the movable ledges retract, and the stack of cartons is released onto a conveyor.

At step S1-6 the stack of cartons is conveyed away from the lidding station.

FIGS. 3 to 6 show another embodiment of the lidding and stacking apparatus.

Figure 3:
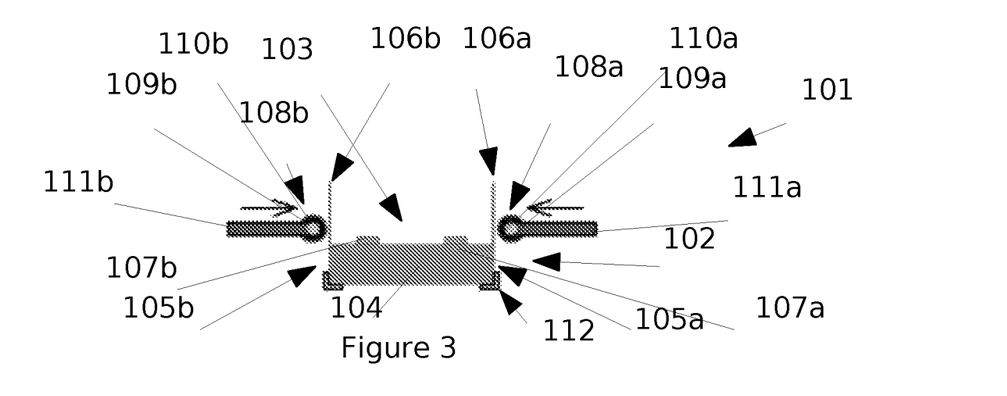
FIG. 3 shows a lidding apparatus according to another embodiment of the invention, with lid panels of a carton in an unfolded configuration.

FIG. 3 shows a box lidding device 101 which forms part of a lidding and stacking apparatus similar to that of FIG. 1. Shown in FIG. 3 is a carton 102 to be lidded or closed. The carton has a carton opening 103 into which contents have been received at another packhouse station.

The carton opening 103 is defined by side walls 104 and end walls 105a and 105b.

Extending from the end walls 105a and 105b are lid panels 106a and 106b. In this embodiment the lid panels 106 are connected to respective walls by foldable joins (not shown) which allow the lid panels 106 to be folded to cover the carton opening 103 and provide a closure for the carton 102.

The carton 102 has closure tabs 107a and 107b which extend upwards, as shown, from the side walls 104. As shown, the tabs extend by a distance from the remaining edge of the wall 104 that is greater than the thickness of the lid panels 106.

The lid panels 105 of this embodiment have closure slots (not shown) which receive and engage the closure tabs 107 to hold the lid panels in a closed position, or folded configuration, over the box opening 103.

The lidding device 101 has closure elements 108a and 108b which are operable to move over the box opening. This movement is transverse to the end walls 105. In this embodiment the closure elements move above the walls 104 and 105 with a clearance that is approximately the thickness of the lid panels 106. The thickness of the lid panels in this embodiment is less than the height of the closure tabs and the clearance between the closure element 108a and the wall 104 is less than the distance of the top of the tabs 107, as shown, and the top of the wall 104.

In this embodiment the closure elements 108 are rollers 109 mounted on axles 110 which are mounted on movable arms 111. In this embodiment the box has two lid panels and the device 101 has a corresponding two closure elements 108a and 108b.

In this embodiment the rollers 109 have tab-clearance slots (not shown) which admit the tabs 107 to allow the rollers to pass over the tabs. The same action assists in pushing the closure slots (not shown) formed in the lid panels into firm engagement with the closure tabs 107. FIG. 3 shows the lid panels 105 in an unfolded or open configuration.

Figure 4:
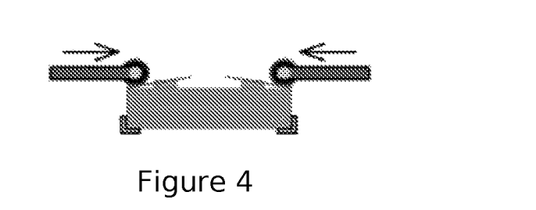
FIG. 4 shows a lidding apparatus according to the embodiment of the invention of FIG. 4, with lid panels of a carton in between the unfolded configuration and a folded configuration.

FIG. 4 shows the lidding device folding the lid panels 106 into a folded configuration. FIG. 4 shows the closure tabs 107 extending partially through the closure slots (not shown) formed in the lid panels 105. The closure arms 111 have moved transversely to the walls 105 and inwards towards each other to positions partially towards meeting each other over the box opening. The closure elements 110 have folded the lid panels in a configuration partially over the box opening 103. The lid panels 105 can be secured in the folded configuration to cover the box opening by engagement of the closure slots (not shown) and closure tabs 107.

FIG. 4 shows the rollers 109 of the closure elements 108 just clearing or rolling over the walls 105.

Figure 5:
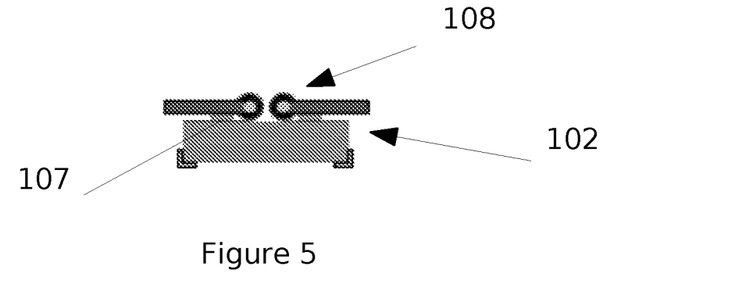
FIG. 5 shows a lidding apparatus according to a preferred embodiment of the invention of FIGS. 4 and 5, with lid panels of a carton in between the folded configuration.

FIG. 5 shows the closure arms 111 having moved further towards each other over the box opening. The closure rollers 109 have been moved past the closure tabs 107 to force the tabs 107 through the closure slots (not shown) in the lid panels. As shown in FIG. 5 the closure tabs 107 extend through and beyond the lid panels 105.

FIGS. 3, 4 and 5 show the box held by fixtures 112. In this embodiment the fixtures have a cross-section which forms corner matching outside, lower edges of a carton 102.

Figure 6:
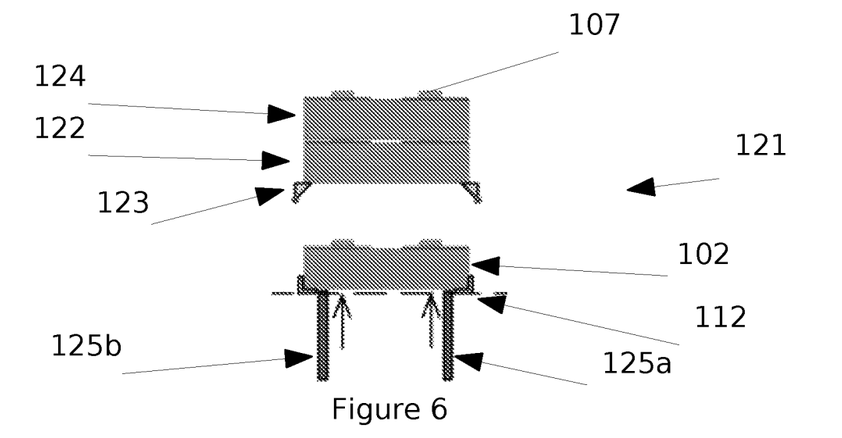
FIG. 6 shows a stacking apparatus according to the embodiment of the present invention of FIGS. 4, 5 and 6, with a carton about to be pushed upwards and joining a stack of cartons.

FIG. 6 shows a stacking device 121 of a preferred embodiment of the present invention. As shown a carton 102 is held in place by fixtures 112. In this embodiment the fixtures 112 are the fixtures of the lidding device 101 of FIGS. 3, 4 and 5. In this embodiment the lidding device 101 and stacking device 121 are at a common lidding and stacking station of a packhouse apparatus.

FIG. 6 also shows a second carton 122 supported by supports 123 above the first carton 102. The supports 123 are movable at a pivot connection (not shown) to a chassis (not shown). The supports are also or able to be withdrawn to release a stack of cartons downwards.

In this embodiment the carton 122 is formed using the same blank pattern as carton 102. In this embodiment the cartons 102 and 122 have slots defined in the walls at the base of each carton to receive closure tabs 107 of a carton below.

FIG. 6 shows a third carton 124 staked on the second carton 122 in a similar manner to how the second carton will be stacked on top of the first carton 102.

FIG. 6 shows two lifting elements, or pushing elements, 125a and 125b. In FIG. 6 the lifting elements 125 are shown in a retracted configuration below the carton 102. Also shown in FIG. 6 is an aperture defined by the fixture 112 to allow the pushing elements to extend past the fixtures 112 to push the carton 102 upwards as shown in FIG. 6.

Figure 7:
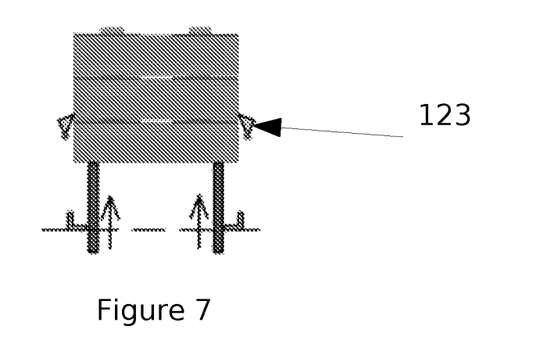
FIG. 7 shows a stacking apparatus according to the embodiment of the invention of FIGS. 4 to 6, with a carton partially pushed upwards.

FIG. 7 shows the pushing elements 125 extending past the fixtures 112 and to a partially extended configuration in which the first carton 102 has been moved into contact with the second carton 122. The closure tabs 107 of the first carton 102 have engaged slots (not shown) in the base of the second carton 122 to secure the second carton 122 against movement lateral and relative to the first carton 102.

As shown in FIG. 7 the supports 123 are in a pivoted position which allows the first carton 102 to be pushed past the supports 123. The supports 123 are able to pivot upwards but not downwards when in a non-return configuration to allow cartons to move upwards past the supports but not return downwards. The supports are able to remain in an upward pivoted position when in a release configuration to allow cartons to move downward past the supports to release the cartons.

Figure 8:
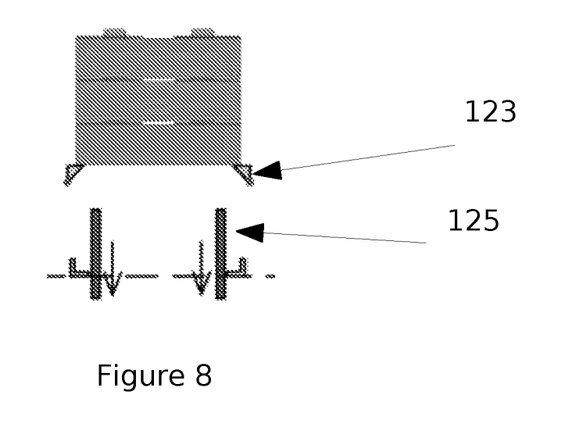
FIG. 8 shows a stacking apparatus according to the embodiment of the invention of FIGS. 4 to 7.

FIG. 8 shows the pushing elements 125 in a partially retracted configuration after a fully extended configuration which has pushed the carton 102 entirely past the supports 123.

As shown in FIG. 7 the supports 123 are in their original configuration which provides levers to support carton 102 with carton 122 stacked upon carton 102.

Further and additional embodiments of the invention are illustrated below.

In various embodiments a lid panel is formed as a flap of a carton. In one example the lid panel is formed as a flap of wall on a blank for the carton.

In alternative embodiments the fixtures are arranged to define a space with is not necessarily an aperture. In one example, the fixtures are provided on posts arranged about a space for a lifting or pushing element.

In further embodiments a rolling element or a folding element are moved over the carton but between the tabs. This may allow the folding element to fold the lid to a level which is below an extremity of the respective tab to force the slot of a lid over a tab such that the tab is received in the slot of a respective lid.

In further embodiments the folding element may include a rod adapted to slide over the lid.

In various embodiments the folding element is a closing element.

In various embodiments one or more lid panels are configurable into a closed configuration in which they provide a closure for the carton. In various embodiments the lid panels are folded into a position in which they provide a closure for the carton.

In various embodiments a movable support is formed of a lever which is able to pivot upwards to allow a carton to pass when pushed upwards past the lever and pivot downwards to support the carton as it returns downwards from a position past the lever. The lever may lock against a downward force provided by the carton and the reader may recognised the lever as a locking lever. The movable support may provide a non-return function to prevent cartons pushed upwards from returning downwards.

In the embodiment of FIG. 1 the printer 10 prints a label for each carton and the label is applied to the carton end. The printer is connected to a central processor which provides information to be printed onto the label and records details about what has been printed.

In further embodiments the printer prints directly onto the carton end.

In alternative embodiments the lidding device and stacking device do not share fixtures.

In alternative embodiments the stacking device may have fewer than two pushing elements.

In other embodiments the stacking device may have more than two pushing elements.

The reader may recognise a pushing element as a lifting element in various applications.

In alternative embodiments the clearance tolerance may be less than the thickness of the lid panels, so the panels are compressed while the closure elements move over them.

In some embodiments a tab is formed as a flange on a wall of a carton.

In alternative embodiments a single lid panel is folded over an open end of the carton to provide a closure for the panel.

In alternative embodiments a lid panel has a single slot formed therein to engage with a single tab.

In alternative embodiments a carton has a single slot formed in it's base to receive a single tab of another carton.

Alternative embodiments may have any number of lifting or pushing elements known to the reader, and may specifically have one integrated pushing element.

In further embodiments the printer is replaced with a RFID encoder device which writes data to an RFID tag that is applied to the carton.

In further embodiments the printer is replaced with a reader device linked to a central processor. The reader device may be an optical reader, barcode reader, RFID reader or other similar device. The reader is used to scan the information that has been applied to the carton prior to its delivery to the lidding station.

In further embodiments the printer or reader may not be required.

In further embodiments the packhouse apparatus has fixtures, folding elements and pushing elements to handle two or more boxes substantially simultaneously.

In alternative embodiments holding ledges, movable supports or locking levers are mounted on a wall of the apparatus.

In various embodiments supports are configurable between a non-return configuration in which they allow a carton to move past the supports in one direction but not to return in the opposite direction and a release configuration in which the cartons are able to return in said opposite direction to release the cartons, typically, downward.

Various embodiments are implemented using a controller operable to control the apparatus to perform the steps and operations of the embodiments described and illustrated above. Various embodiments have a controller known by the reader to be suitable for given applications and may include programmable logic arrays, microcontrollers, microprocessors, computers, computer services or software services.

Various embodiments of the invention are implemented using software stored on a computer readable medium to define the processes or operations of various embodiments described and illustrated above.

Various embodiments of the invention are implemented using a computer running executable code defining the processes or operations of various embodiments described and illustrated above.

As used herein the term "a" is used in an inclusive sense to specify the presence of the stated feature or features and is not intended to exclude "another" of the features or features.

As used herein the term "closure" may be a noun for a panel, flap or other element used to close a carton, such as by covering an opening or a portion of an opening for example.

In the preceding description and the following claims, the word "comprise" or equivalent variations thereof is used in an inclusive sense to specify the presence of the stated feature or features. This term does not preclude the presence or addition of further features in various embodiments.

As used herein the term 'operable' is used broadly to refer to being able to perform a given function, movement, operation, motion or role.

Herein individual examples of similar components may be referenced using a and b, but for succinctness a reference to a plurality of the components may omit the a or b and reference the components by the number only.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

What we claim is:

1. A process of preparing a closable carton having one or more lid panels extending from respective one or more walls of the carton, having one or more tabs and having respective one or more slots each adapted to receive a tab to secure the lid panels in a closed configuration in which the one or more lid panels provides a closure for the carton, the process comprising the step of moving a folding element transversely to each wall from which a lid extends to move the one or more lids into a closed configuration to close the carton, wherein the step of moving the folding element comprises rolling a folding element comprising a roller with a slot formed in a position which is aligned with a tab over the carton.

2. The process of claim 1 wherein the step of moving the folding element comprises moving the folding element over the carton but between the tabs.

3. The process of claim 1 wherein the process further comprises a step of securing the carton with one or more fixtures and wherein the one or more fixtures engage edges of the wall forming corners of the carton.

4. The process of claim 3 wherein the one or more tabs are arranged to extend through and beyond respective one or more slots in the one or more lid panels in the closed configuration.

5. The process of claim 4 wherein the carton comprises one or more slots formed in an underside of the carton to allow an upper carton to receive respective the one or more tabs from a carton below to secure the upper carton and the carton below in a stack.

6. The process of claim 5 wherein the one or more fixtures are arranged about one or more spaces through which pushing elements are able to extend to push a carton upwards.

7. The process of claim 1 further comprising a step of pushing the carton upwards past one or more locking levers which hold the carton against returning downwards if the one or more pushing element returns downwards.

8. The process of claim 1 further comprising a step of returning the pushing element downwards to a position under the one or more fixtures.

9. The process of claim 7 wherein the step of pushing the carton upwards comprises pushing the carton up under and into contact with a carton which is supported by one or more locking levers to provide a stack of cartons.

10. An apparatus comprising:
a fixture which secures a first carton;
one or more lid-closing elements that move over a secured first carton and fold one or more lid panels of the first carton to close the first carton, wherein the one or more lid panels extend from respective one or more walls of the first carton; one or more pushing elements which push the first carton upwards from the one or more fixtures;
one or more supports located above the fixtures to that support a second carton above the first carton, wherein the lid closing element comprises a roller and wherein the roller has a slot formed therein to admit a closure tab while the roller moves over the first carton to allow the roller to move over the carton with a clearance that is less than the height of the closure tab extending from the wall of the carton.

11. The apparatus of claim 10, wherein the support is arranged to be configurable into a non-return configuration to prevent a carton returning downward and configurable into a release configuration to release a carton to return downward.

12. The apparatus may of claim 11 comprising a conveyor operable to convey a released carton or stack of cartons.

13. The apparatus of claim 10 wherein the one or more supports may be movable so as to allow the first carton to move past the support to form a stack of the first carton and the second carton.

14. The apparatus of claim 13 wherein a movable support comprises a lever attached to a chassis at a pivot which allows the lever to move upwards to allow the first carton to move past the lever and to move downwards to allow the lever to support the first carton once it has moved past the lever.

15. The apparatus of claim 10 wherein a support is operable to allow the first carton to be added to a stack of cartons comprising the second carton by the first carton being pushed up under the second carton and then supported by the movable support.

16. The apparatus of claim 10 wherein the one or more lid-closing elements are operable to move over an open area of the first carton to fold a lid panel over an aperture of the carton to close at least a part of the opening for the first carton.

17. The apparatus of claim 10 wherein the one or more lid-closing elements are operable to move over an open area of the first carton so as to cause a closure slot formed in a lid panel to receive a closure tab of the carton to secure the lid panel over the open area of the carton.

18. The apparatus of claim 17 wherein lid-closing element is arranged to be movable over a wall of the carton within a clearance which is below an upper edge of the closure tab extending from a wall of the carton to force the closure slot formed in the lid panel of the carton into engagement with the closure tab to secure the lid over the open area of the carton.

19. The apparatus of claim 18 wherein the closure element comprises a closure arm operable to slide over the lid panel.

* * * * *